(12) United States Patent
Neumetzler et al.

(10) Patent No.: US 7,894,196 B2
(45) Date of Patent: Feb. 22, 2011

(54) CONNECTING MODULE TO BE USED IN TELECOMMUNICATION AND DATA TECHNOLOGY

(75) Inventors: Heiko Neumetzler, Berlin (DE); Harald Klein, Berlin (DE); Johann Oltmanns, Berlin (DE); Antony Nijhuis, Modautal-Brandau (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 12/755,187

(22) Filed: Apr. 6, 2010

(65) Prior Publication Data

US 2010/0190374 A1 Jul. 29, 2010

Related U.S. Application Data

(63) Continuation of application No. 11/661,657, filed as application No. PCT/EP2005/009317 on Aug. 30, 2005, now Pat. No. 7,710,733.

(30) Foreign Application Priority Data

Sep. 10, 2004 (DE) ........................ 10 2004 043 764

(51) Int. Cl.
*H05K 7/00* (2006.01)
(52) U.S. Cl. ..................... 361/728; 361/826; 439/540.1
(58) Field of Classification Search ................. 361/728, 361/827, 732, 825, 826; 439/540.1; 211/26
See application file for complete search history.

(56) References Cited

U.S. PATENT DOCUMENTS

| 5,127,851 | A | 7/1992 | Hilbert et al. |
| 6,049,709 | A | 4/2000 | Anderson et al. |
| 6,289,210 | B1 | 9/2001 | Anderson et al. |
| 7,548,434 | B2 | 6/2009 | Busse et al. |
| 7,710,733 | B2 * | 5/2010 | Neumetzler et al. ......... 361/728 |
| 2003/0156389 | A1 | 8/2003 | Busse et al. |
| 2006/0114660 | A1 | 6/2006 | Busse et al. |
| 2007/0082522 | A1 | 4/2007 | Bonvallat et al. |
| 2008/0038962 | A1 | 2/2008 | Neumetzler et al. |

FOREIGN PATENT DOCUMENTS

| AU | 611441 B | 2/1989 |
| CN | 2300543 | 12/1998 |
| DE | 198 03 420 A1 | 8/1999 |
| DE | 102 36 361 A1 | 3/2004 |
| EP | 0 300 065 A1 | 1/1989 |
| EP | 0 304 393 B1 | 2/1989 |
| GB | 2 336 725 A | 10/1999 |
| KR | KS 20-0353314 | 6/2004 |
| WO | WO 01/97339 A1 | 12/2001 |

\* cited by examiner

*Primary Examiner*—Hae Moon Hyeon
(74) *Attorney, Agent, or Firm*—Merchant & Gould P.C.

(57) ABSTRACT

A connection module that mounts to a frame includes a housing and electrical contacts positioned on different ends of the housing. A first fixing member defines a channel sized to receive at least a portion of a frame. A second fixing member is moveable relative to the first fixing member to extend at least partially across the channel of the first fixing member.

20 Claims, 3 Drawing Sheets

CONNECTING MODULE TO BE USED IN TELECOMMUNICATION AND DATA TECHNOLOGY

CROSS-REFERENCES TO RELATED APPLICATIONS

This application is a Continuation of U.S. Ser. No. 11/661,657, filed 27 Mar. 2008, which is a National Stage Application of PCT/EP05/09317, filed 30 Aug. 2005, which claims benefit of Serial No. 10 2004 043 764.5, filed 10 Sep. 2004 in Germany and which applications are incorporated herein by reference. To the extent appropriate, a claim of priority is made to each of the above disclosed applications.

BACKGROUND

The invention relates to a connection module for telecommunications and data technology.

EP 0 304 393 B1 discloses an apparatus for holding connection strips which use remote-control technology, comprising a mounting frame, at least one connection strip arranged on said mounting frame and at least one connecting element, the mounting frame being formed from at least one round rod mounted in a frame part, and the connection strip having an arched snap element as the connecting element which can be latched onto the round rod and can be displaced on the round rod. In this case, the connection strip preferably has two such connecting elements which are then each latched onto a round rod. Furthermore, the arched attachments of the connection strip preferably surround the round rod at an angle of more than 180°. The connection strip comprises an upper and a lower part, the two arched attachments being integrally formed on the housing lower part. The contacts inserted in the upper part are preferably in the form of insulation-piercing contacts. WO 01/97339 A1 discloses a distributor connection module for telecommunications and data technology, comprising a housing, in which input and output contacts are arranged such that they are accessible from the outside for the purpose of connecting lines and wires, the housing being formed with a cavity, in which functional elements are arranged between the input and output contacts. In this case, the functional elements are arranged on at least one printed circuit board which is supported in the housing. Furthermore, an embodiment is disclosed in which the input and output contacts are arranged on opposing end faces of the housing. Grounding lines on the printed circuit board are formed by at least one annular or forked contact such that they are accessible from the outside, it being possible for the annular or forked contacts to be electrically and mechanically connected to round rods.

In addition to the round rods described, further cross-sectional shapes are also possible, such as, for example, hexagonal, oval or else square or rectangular shapes, pivoting no longer being possible in the latter cases.

SUMMARY

The invention is based on the technical problem of providing a connection module for telecommunications and data technology, by means of which improved connection between the connection module and the mounting frame is achieved.

For this purpose, the fixing element is of at least two-part design having a first and a second fixing part, it being possible for the connection module to be plugged onto the mounting frame by means of the first fixing part and to be latched onto the mounting frame by means of the second fixing part. The invention is in this case based on the knowledge that, given certain preconditions, simply snapping or latching the connection module onto the mounting frame does not ensure sufficient reliability for fixing purposes. For example, in the case of work on the rear of the mounting frame, it may come about that the connection modules are inadvertently pressed by the mounting frame. This problem is increased when contacts are provided on the end face of the rear, since in this case, owing to a plugging or connecting process, forces act on the connection module which push the connection module from the mounting frame. This is now prevented by the second fixing part. In this case, the first fixing part may already produce a certain latching connection with the mounting frame, but this is not necessarily the case.

The first and second fixing parts preferably completely surround the mounting frame around its circumference.

In one further preferred embodiment, the second fixing part is hinged on the first fixing part and/or on the connection module. By this means, the second fixing part lies on the connection module such that it cannot be released. In principle, however, embodiments are conceivable where the second fixing part is latched as a separate part, for example, onto the first fixing part in order to then form a continuous contour.

In one further preferred embodiment, the second fixing part is hinged on one side on the first fixing part and/or on the connection module and, on the other side, can be latched with the first fixing part and/or the connection module, it further preferably being possible for the latching connection to be released without any disruption. This achieves a very simple and stable connection. For this purpose, the connection module is pushed with its pivoted-on, second fixing part onto the mounting frame, and then the second fixing part swings shut and is latched. If it is then intended for the connection module to be replaced or displaced or pivoted on the mounting frame, the latching connection is released in a simple manner.

In particular in the case of applications where the connection modules are intended to be arranged such that they can be displaced and/or pivoted on the mounting frame, the mounting frames are in the form of round rods. In this case, the first fixing part is preferably arched, but at least has arched partial sections.

In a further preferred embodiment, the contacts are arranged on opposing end faces of the housing.

In a further preferred embodiment, the opposing end faces in this case have a different width, the first fixing part being arranged laterally on the narrower end face.

In a further preferred embodiment, the contacts of one end face are at least partially electrically connected to the contacts of the other end face.

At least one printed circuit board is preferably arranged in the housing, at least individual contacts being electrically connected via the printed circuit board.

It is further preferred for filter assemblies, protective elements and/or amplifier circuits to be arranged on the electrical printed circuit board. The filter assemblies may in this case be designed, for example, for signal isolation in XDSL applications, for noise suppression and/or for impedance matching. The protective elements are, for example, in the form of overvoltage protection elements, reference being made for details in this regard to, for example, WO 01/97339 A1.

At least some of the contacts are preferably in the form of insulation-piercing contacts. It is further preferable for the contacts on the narrower end face to be in the form of insulation-piercing contacts. The insulation-piercing contacts are in this case further preferably arranged in a connection strip which can be latched to the housing. In this case, the insulation-piercing contacts are further preferably formed on the rear ends with fork contacts, by means of which the electrical contact to the printed circuit board is produced.

It is further preferred for the contacts on the rear end face to be in the form of coaxial plug connectors. Other plug connectors, such as, for example, RJ 45 plug connectors or else insulation-piercing contacts may also be used, however.

In a further preferred embodiment, the connection module also comprises isolating contacts, by means of which the electrical connection between two contacts can be broken. The isolating contacts are in this case preferably accessible from the end face by the insulation-piercing contacts, as long as insulation-piercing contacts are provided.

BRIEF DESCRIPTION OF THE DRAWINGS

The invention will be explained in more detail below with reference to a preferred exemplary embodiment. In the figures.

DETAILED DESCRIPTION

Figure 1:
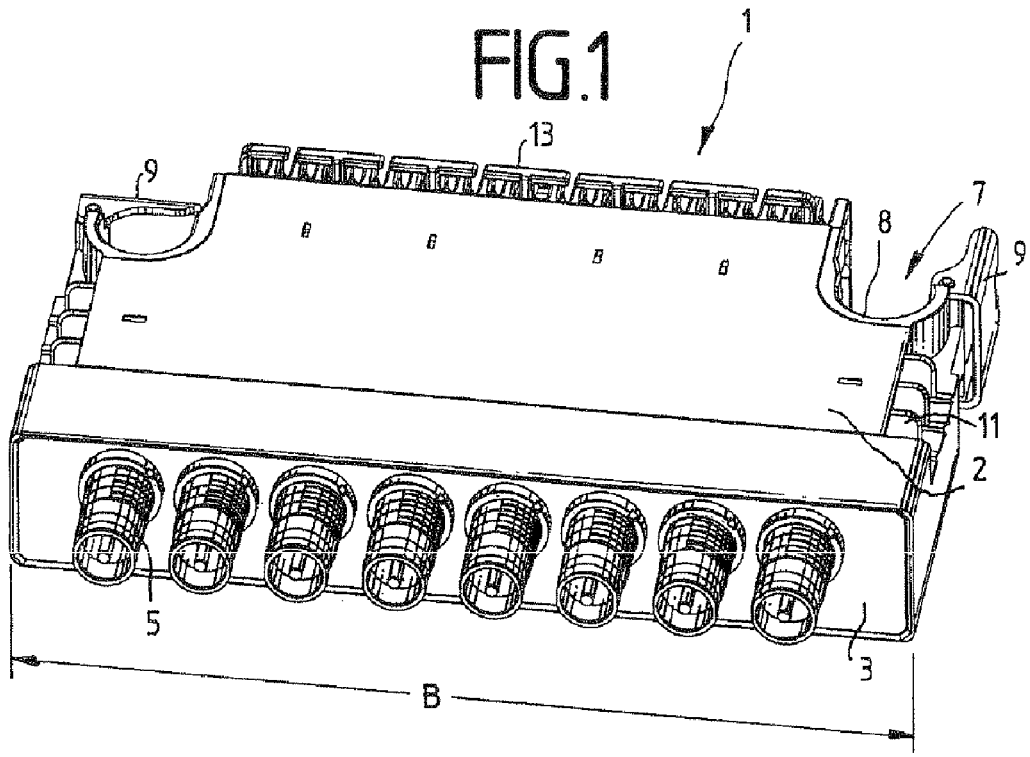
FIG. 1 shows a connection module in a perspective rear view.
Figure 2:
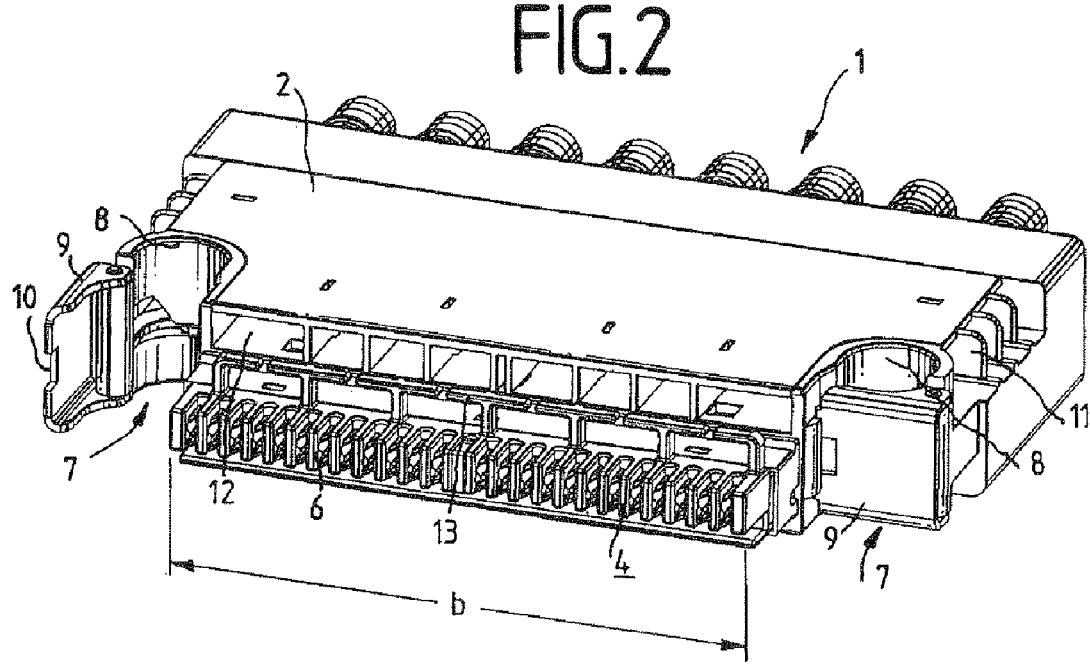
FIG. 2 shows the connection module in a perspective front view.

The connection module 1 comprises a housing 2 having a first end face 3 having the width B and an opposing end face 4 having the width b, where B>b. Eight coaxial plug connectors 5 are arranged on the end face 3, and sixteen insulation-piercing contacts 6 are arranged on the end face 4 for the purpose of connecting eight twin wires. The insulation-piercing contacts 6 are electrically connected via filter assemblies for impedance matching to the coaxial plug connectors 5 via a printed circuit board arranged in the housing 2. Arranged adjacent to and slightly set back from the end face 4 are two fixing elements 7. As can be seen in FIG. 2, the left-hand fixing element 7 is illustrated in an open position, and the right-hand fixing element is illustrated in a closed position. The fixing element 7 is of two-part design, a first fixing part 8 being arched and being formed from the housing 2. In the example illustrated, the first fixing part 8 is thus part of the housing 2. The second fixing part (door) 9 is hinged such that it can pivot on the outer edges of the first fixing part 8. The second fixing part 9 is in this case formed with at least one latching element 10 which can latch in in a releasable manner on the other side of the first fixing part 8. Furthermore, arranged laterally (on one or both sides) and on the upper side of the housing 2 are wire guides 11, 12 for the twin wires. Wire guides 13 are likewise arranged on the connection strip bearing the insulation-piercing contacts 6. It is likewise possible, for the purpose of connecting shielded wires, to use twenty-four or twenty-five insulation-piercing contacts 6 instead of sixteen. It is also noted that an end contact can be arranged in the fixing part 8 for the purpose of producing a connection to ground.

Figure 3:
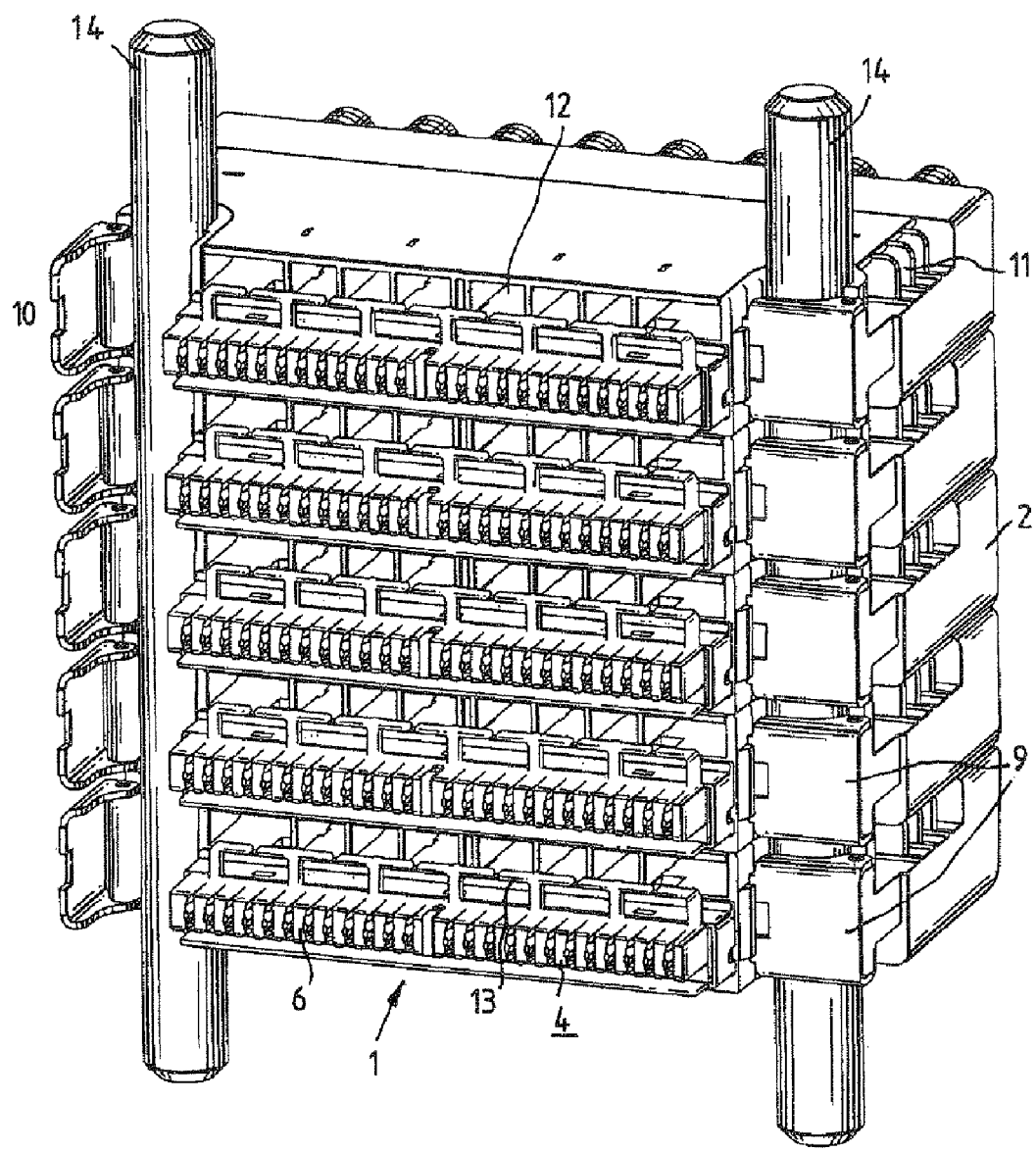
FIG. 3 shows a plurality of connection modules in a perspective front view in a mounting frame having round rods.
Figure 4:
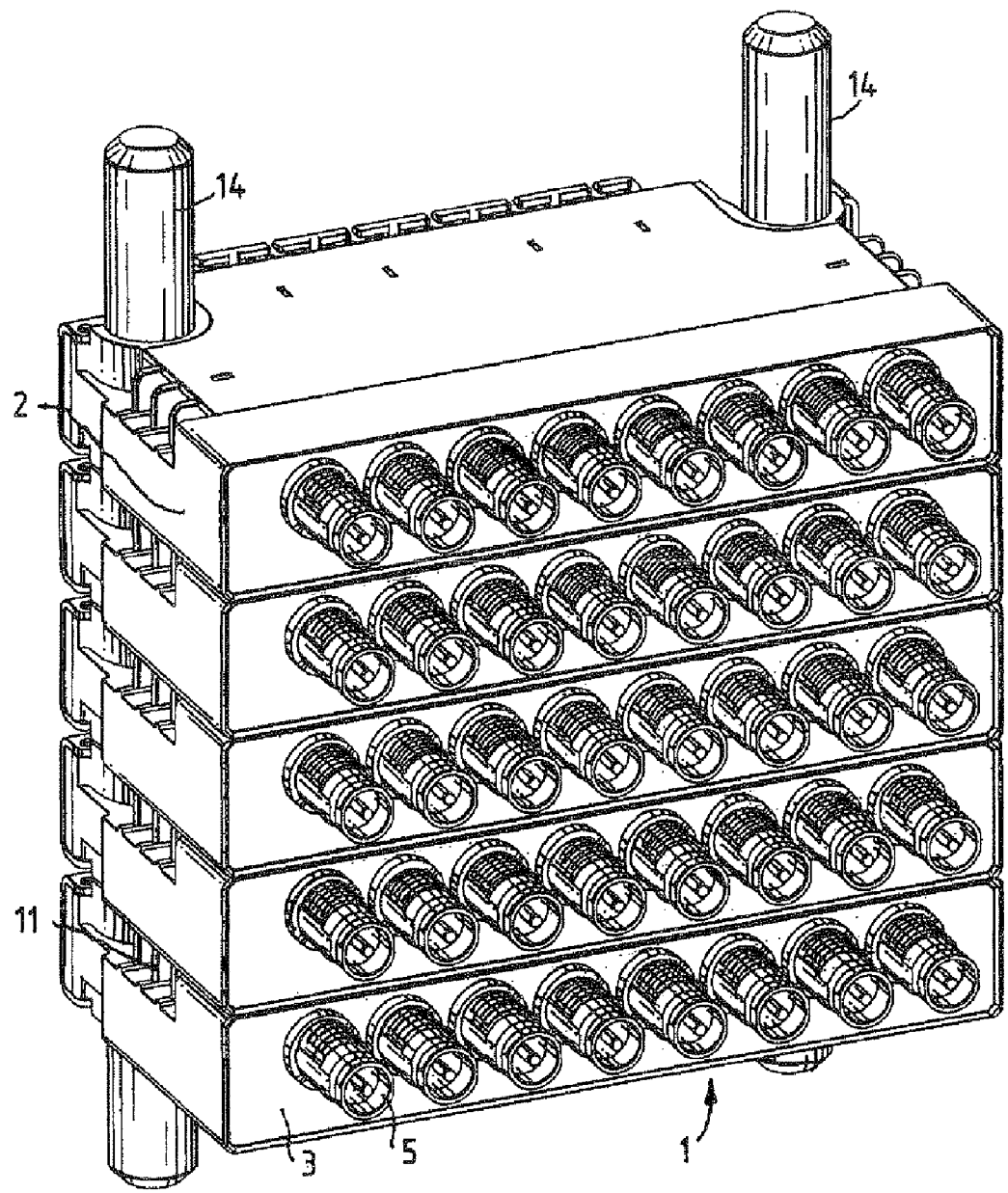
FIG. 4 shows a perspective rear view of the connection modules.

With reference to FIGS. 3 and 4, the mode of operation of the connection module 1 will be explained in more detail. As can be seen from FIGS. 3 and 4, in this case in each case five connection modules 1 on two round rods 14 are illustrated as part of a mounting frame. In this case, the end face 3 having coaxial plug connectors 5 is usually the system face, and the end face 4 having the insulation-piercing contacts 6 is usually the jumper face. On the system face, a connection which has been made is usually not altered much anymore, whereas the wiring on the jumper face needs to be altered more frequently. Correspondingly, a connection module 1 is fixed on a mounting frame such that the jumper face is accessible from the front of the mounting frame, on which there is generally more room for jumper work. In the present example, the connection modules 1 are thus pushed onto the round rods 14 from the rear of the mounting frame and are then latched onto the round rods 14 by the second fixing parts 9 being swung shut and latched. The degree of latching may in this case either be selected such that the connection strip is fixed on the round rods 14 or else selected such that the connection modules 1 can still be displaced in the longitudinal direction of the round rods 14. As can best be seen in FIG. 3, without the second fixing parts 9 there would be the risk when connecting wires to the insulation-piercing contacts 6 that the connection forces would push the connection module 1 from the round rods 14.

LIST OF REFERENCE NUMERALS

1 Connection module
2 Housing
3 First end face
B Width of the first end face
4 Opposing end face
b Width of the opposing end face
5 Coaxial plug connector
6 Insulation-piercing contacts
7 Fixing element
8 Fixing part
9 Fixing part
10 Latching element
11 Wire guide
12 Wire guide
13 Wire guide
14 Round rods

The invention claimed is:

1. A connection module configured to mount to a frame, the connection module comprising:
    a housing having a first end and a second end;
    a first plurality of electrical contacts positioned on the first end of the housing;
    a second plurality of electrical contacts positioned on the second end of the housing, the electrical contacts on the second end being at least partially electrically coupled to the electrical contacts on the first end;
    a first fixing member positioned at the second end of the housing, the first fixing member defining a channel sized to receive at least a portion of the frame; and
    a second fixing member positioned at the second end of the housing, the second fixing member being moveable relative to the first fixing member to extend at least partially across the channel of the first fixing member.

2. The connection module as claimed in claim 1, wherein the second fixing member is configured to latch to the first fixing member.

3. The connection module as claimed in claim 2, wherein the second fixing member inhibits axial movement of the housing along a length of the frame when the second fixing member is latched to the first fixing member.

4. The connection module as claimed in claim 2, wherein the second fixing member is moveable relative to the first fixing member to extend completely across the channel.

5. The connection module as claimed in claim 1, wherein the second fixing member is hingedly coupled to the first fixing member.

6. The connection module as claimed in claim 5, wherein a first end of the second fixing member is hingedly mounted to a first end of the first fixing member.

7. The connection module as claimed in claim 1, further comprising:
   a plurality of first fixing members positioned at the second end of the housing, each first fixing member defining a channel sized to receive at least a portion of the frame, each first fixing member being spaced from the other first fixing members; and
   a plurality of second fixing members positioned at the second end of the housing, each second fixing member being moveable relative to a corresponding first fixing member to extend at least partially across the channel of the first fixing member.

8. The connection module of claim 7, wherein one of the first fixing members is positioned at one side of the second end of the housing and another of the fixing members is positioned at an opposite side of the second end of the housing.

9. The connection module as claimed in claim 7, wherein each of the first fixing members defines an arched shape.

10. The connection module as claimed in claim 1, wherein the first end of the housing faces in an opposite direction from the second end of the housing.

11. The connection module as claimed in claim 10, wherein the electrical contacts positioned on the second end of the housing include insulation piercing contacts.

12. The connection module as claimed in claim 11, wherein the electrical contacts positioned on the first end of the housing include coaxial plug connectors.

13. The connection module as claimed in claim 10, wherein the first end of the housing has a different width than the second end of the housing.

14. The connection module as claimed in claim 13, wherein the second end of the housing is narrower than the first end of the housing.

15. A connection module configured to mount to a frame, the connection module comprising:
   a housing having a first end and a second end, the housing defining first and second U-shaped channels at opposite sides of the second end for receiving at least a portion of the frame;
   a first plurality of electrical contacts positioned on the first end of the housing;
   a second plurality of electrical contacts positioned on the second end of the housing, the electrical contacts on the second end being at least partially electrically coupled to the electrical contacts on the first end; and
   a first door positioned at the first channel, the first door being moveably mounted to the housing to move between a first position providing access to the first channel and a second position inhibiting access to the first channel; and
   a second door positioned at the second channel, the second door being moveably mounted to the housing to move between a first position providing access to the second channel and a second position inhibiting access to the second channel.

16. The connection module as claimed in claim 15, wherein the first and second doors are configured to latch over the first and second channels, respectively, when moved to the second position.

17. The connection module as claimed in claim 15, wherein the first end of the housing faces in an opposite direction from the second end of the housing.

18. The connection module as claimed in claim 17, wherein the electrical contacts positioned on the second end of the housing include insulation piercing contacts.

19. The connection module as claimed in claim 18, wherein the electrical contacts positioned on the first end of the housing include coaxial plug connectors.

20. The connection module as claimed in claim 17, wherein the second end of the housing is narrower than the first end of the housing.

* * * * *